Figure 1:
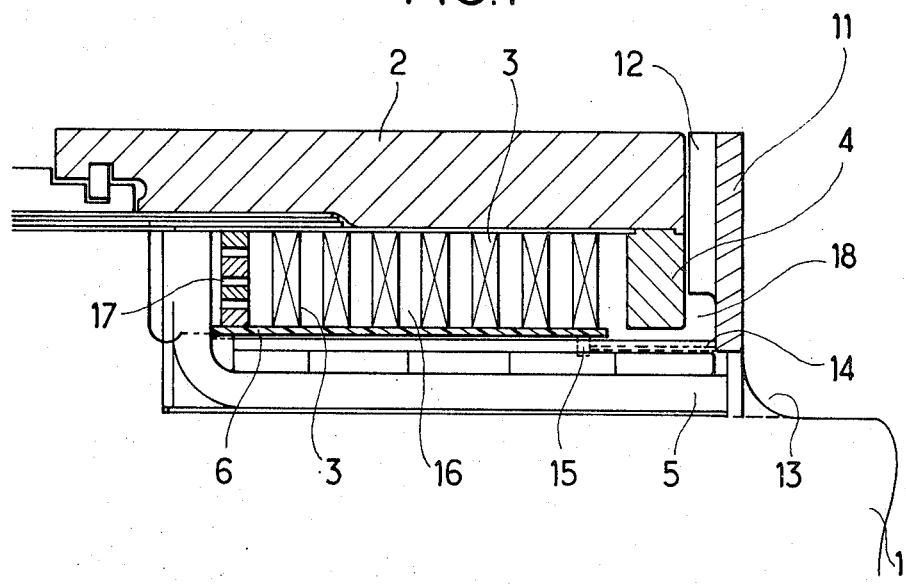

United States Patent [19]
Lehuen et al.

[11] 3,814,959
[45] June 4, 1974

[54] COOLING ARRANGEMENT FOR ROTARY ELECTRIC MACHINES

[75] Inventors: Christian Lehuen, Cravanche; Roger Gillet, Belfort, both of France

[73] Assignee: Societe Generale De Constructions Electriques Et Mecanique (Alsthom), Paris, France

[22] Filed: June 23, 1972

[21] Appl. No.: 265,474

[30] Foreign Application Priority Data
June 23, 1971  France .......................... 71.22965

[52] U.S. Cl. .................................. 310/55, 310/61
[51] Int. Cl. .................................... H02k 9/00
[58] Field of Search ............ 310/55, 52, 54, 56, 58, 310/61, 62, 63, 65, 59

[56] References Cited
UNITED STATES PATENTS

| | | | |
|---|---|---|---|
| 2,153,563 | 4/1939 | Hubacker | 310/43 |
| 2,712,085 | 6/1955 | Willyoung | 310/61 |
| 3,075,104 | 1/1963 | Willyoung | 310/61 |
| 3,225,231 | 12/1965 | Kudlacik | 310/55 |
| 3,322,985 | 5/1967 | Azbukin | 310/61 |
| 3,340,412 | 9/1967 | Wiedemann | 310/61 |
| 3,465,183 | 9/1969 | Wallenstein | 310/54 |
| 3,497,736 | 2/1970 | Cuny | 310/65 |
| 3,504,207 | 3/1970 | Tjernstrom | 310/59 |

*Primary Examiner*—R. Skudy
*Attorney, Agent, or Firm*—Craig and Antonelli

[57] ABSTRACT

In the cooling with gas of the rotor winding heads of rotary electric machines, such as turbogenerators, having axial inlet and outlet channels for the gas disposed under the winding heads, channels are made up of a succession of axial notches within the shaft of the rotor, closed by an insulating tube which is pressed against the winding heads by centrifugal force and equipped with sealing bands or seals gliding in grooves located in the rotor shaft between the axial notches.

7 Claims, 2 Drawing Figures

COOLING ARRANGEMENT FOR ROTARY ELECTRIC MACHINES

The present invention relates to the cooling of rotor winding heads of rotary electric machines, particulary turbogenerators, and particularly with the use of gas.

When cooling the rotor winding heads of a rotary electric machine with gas, the cooling gas enters into the spaces formed between these winding heads, and therefore, the cooling is particularly effective if one provides transverse channels in the winding heads, for example by using grooved conductors, and if the gas is made to circulate through these transverse channels.

It is already known that the introduction and/or the evacuation of the cooling gas can be carried out by means of axial channels disposed under the winding heads and separated from the latter by means of a screen equipped with perforations which assure communication between the axial channels, on the one hand, and the winding heads, on the other hand.

It has also been proposed that a tubular piece be disposed between the shaft of the rotor and the winding heads in which is formed axial channels for the purpose of supplying and evacuating cooling gas. Also, the tubular piece may be provided with additional channel elements which are secured to or at least supported on this tubular piece. But the result in either case is a reduction in the diameter of the shaft of the rotor for a given outside diameter of the rotor and a significant stress on the clamp for holding the rotor winding heads.

The present invention is concerned with a new construction wherein the axial conduits are disposed under the winding heads for conveying the cooling gas, which construction prevents the aforementioned disadvantages and drawbacks. The invention is characterized in that these axial conduits consist of a succession of axial notches disposed in the shaft of the rotor forming between them a plurality of teeth on the shaft of the rotor, and in that the screen equipped with perforations consists of an insulating tube which is pressed against the winding heads by centrifugal force and with respect to which the fluid-tightness of the axial conduits is obtained by means of axial seals having a variable radial thickness and being inserted between the rotor shaft and the insulating tube circumferentially opposite the teeth of the rotor shaft.

The rotor shaft therefore has a maxium inertia to bending, hence a maximum rigidity, a minimum deflection, and the highest critical bending speed. Furthermore, the axial channels are directly incorporated in the shaft and therefore do not rest upon the heads of the rotor winding at all, nor the clamp which holds them together, not even during the rotation thereof.

The insulating tube is biased outwardly against the coil heads by centrifugal force. It may consist of a single piece of elastic material, but it is preferably provided of at least two parts made from a rigid material. This insulating tube closes the axial channels and the spaces comprised between the different winding coils and also constitutes the dielectric insulation between the rotor shaft and the coil heads of the rotor winding.

The variable radial thickness of the axial seals between the shaft and the insulating tube could be obtained also by making these seals from radially elastic bands secured to one of these members, or from independent rigid bands gliding in grooves provided in each of these members, but it is equally possible to make them from rigid bands provided on the insulating tube and possibly forming with the latter a single piece or element and radially sliding in an axial groove of the rotor shaft.

Figure 2:
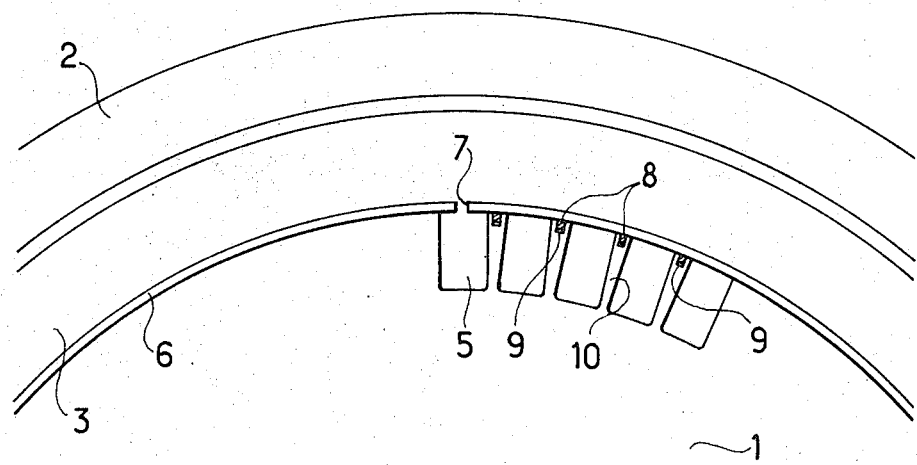

One exemplary embodiment of the present invention will now be described with reference to the accompanying drawing, wherein:

FIG. 1 is a partial longitudinal sectional view of one end of the turbogenerator in the area of the winding heads, and FIG. 2 is a partial end sectional view of the turbogenerator, with the ventilator and the centering ring having been omitted therefrom.

The rotor shaft 1 of the turbogenerator is provided in the conventional manner with a holding clamp 2 for the winding heads 3, this clamp being, in turn, provided with a centering ring 4, as seen in FIG. 1.

Milled into the shaft 1 are notches 5 which form, for example, alternate inlet and outlet channels for the cooling gas. A tube 6 consisting of a rigid insulating material and made up of two parts, one end of which is apparent at 7 in FIG. 2, is pressed due to centrifugal force against the winding heads 3 as the rotor shaft is rotated. This tube 6 is maintained in position in this example only by virtue of the centrifugal force, but gluing or bonding means or either tangential or axial wedging or clamping members could also be provided for this purpose. Axial bands or seals 8 are provided in the tube 6 and glide radially in grooves 9 which are arranged in the teeth 10 formed between the notches 5, which seals assure the fluid-tightness of the respective axial channels under the coil heads.

A ventilator 11 of the centrifugal type provided with wings 12, which could also be a simple smooth disc, is mounted on the shaft 1, preferably above orifices 13 serving for the admission of the cooling gas into the axial inlet channels formed by every other one of the notches 5. These inlet channels are closed in the zone comprised between the ventilator 11 and the insulating tube 6 by means of keys 14, a seal 15 assuring the connection between the keys 14 and the insulating tube 6.

The cooling gas passes from the inlet channels into the spaces 16 between the winding heads 3 through apertures (not shown) in the tube 6. It passes through the winding heads into small channels 17 and leaves through other apertures (not shown) in the tube 6 within the axial output channels constituted by the other notches 5. From there, the cooling gas reaches the output chamber 18 where it is subjected to the action of the ventilator 11.

In this example, the cooling gas flows through the winding heads, which is to say that the gas enters into a space between two winding heads and leaves by another space between the winding heads, but the present invention is applicable also to the case where the gas entering into a space comprised between two winding heads leaves through the same space in order to penetrate into the axial outlet channels.

What is claimed is:

1. In a rotary electric machine, such as a turbogenerator, having a rotor shaft and a plurality of winding heads disposed annularly about said rotor shaft, means for cooling said winding heads by circulation of gas therethrough comprising a plurality of axial channels formed within the peripheral surface of said rotor shaft, a perforated insulating tube disposed between said rotor shaft and said winding heads with the perforations thereof providing communication between said axial channels and said winding heads, and a plurality of axial seals having a variable radial thickness and being disposed between the rotor shaft and said insulating tube in the spaces between said axial channels so as to provide a fluid-tight separation between said axial channels.

2. The combination defined in claim 1 wherein said insulating tube is provided in at least two parts and is made of a rigid material.

3. In a rotary electric machine, such as a turbogenerator, having a rotor shaft and a plurality of winding heads disposed annularly about said rotor shaft, means for cooling said winding heads by circulation of gas therethrough, comprising a plurality of axial channels forming conduits in said rotor shaft, a perforated insulating tube disposed between said rotor shaft and said winding heads with the perforations thereof providing communication between said axial channels and said winding heads, and a plurality of axial seals having a variable radial thickness and being disposed between the rotor shaft and said insulating tube in the spaces between said axial channels so as to provide a fluid-tight separation between said axial channels, wherein said axial seals are formed of rigid bands secured to the inner surface of said insulating tube and extending into respective notches in said rotor shaft between said axial channels.

4. The combination defined in claim 3 wherein a ventilator is disposed on said rotor shaft adjacent said plurality of winding heads to aid in the movement of said cooling gases through said winding heads.

5. The combination defined in claim 4 wherein a plurality of keys are disposed between said ventilator and said insulating tube above at least some of said axial channels.

6. The combination defined in claim 5 wherein inlet openings are provided for alternate ones of said axial channels and outlet openings are provided for the remaining axial channels so that the axial channels form alternate inlet and outlet passages for the cooling gas.

7. The combination defined in claim 6 wherein said insulating tube is provided in at least two parts and is made of a rigid material.

* * * * *